United States Patent [19]

Chen

[11] Patent Number: 6,079,825
[45] Date of Patent: Jun. 27, 2000

[54] NOSE PAD AND HANGER ASSEMBLY FOR EYEGLASSES

[76] Inventor: Ping-Huang Chen, P.O. Box 90, Tainan-City, Taiwan

[21] Appl. No.: 09/422,957

[22] Filed: Oct. 22, 1999

[30] Foreign Application Priority Data

Jun. 25, 1999 [TW] Taiwan ................................ 88210527

[51] Int. Cl.⁷ ...................................................... G02C 5/12
[52] U.S. Cl. ............................................ 351/138; 351/136
[58] Field of Search .................................... 351/137, 136, 351/41, 138

[56] References Cited

U.S. PATENT DOCUMENTS 2,080,853  5/1937  Nelson ..................................... 351/137
5,457,506  10/1995  Winkler .................................... 351/137

*Primary Examiner*—Hung Xuan Dang

[57] ABSTRACT

A nose pad for eyeglasses includes a nose pad body and an insert member extending sidewise from the nose pad body, and a pad hanger extending from a lens rim for the insert member to fit in a square hole of the pad hanger. The insert member has two parallel horizontal fitting members separated with a gap. The two fitting members respectively have a front sloped section to facilitate the fitting members compressed and pushed in the hole of the pad hanger so that the nose pad is easy and quick to be secured with the pad hanger for use. And the nose pad is made of plastic, very light and comfortable for wearing on the nose of a user, with low cost in manufacturing.

1 Claim, 3 Drawing Sheets

NOSE PAD AND HANGER ASSEMBLY FOR EYEGLASSES

BACKGROUND OF THE INVENTION

This invention relates to a nose pad for eye-glasses, particularly to one that is easy and quick to assemble, and low in cost.

A conventional nose pad for eyeglasses is shown in FIG. 1 and includes a connector 10, a nose pad body 11 and a pivotal block 100 as its main components.

The pivotal block 100 is welded on the connector 10, having a recess 101, a threaded hole 102 formed respectively in two opposite walls and communicating with the recess 101.

The nose pad body 11 has a block 110 fixed on a rear side and is having a through hole 111 and fitted in the recess 101. Then a screw N engages the threaded holes 102 and the through hole 111 of the block 110, pivotally connecting the nose pad body 11 to the connector 10. Thus the nose pad body 11 may be placed on the nose of a user, after being pivotally connected to the connector 10.

However, the known conventional nose pad requires time and work in assembling with the screw N. Further, the screw N may be lost, due to separating from the blocks 100 and 110 after a period of use.

SUMMARY OF THE INVENTION

The objective of the invention is to offer a nose pad that is easy and quick to assemble, and low in cost.

The main feature of the invention is a nose pad body formed integral as one unit, having a nose pad body provided with an insert member extending sideways from the nose pad body. The insert member has two parallel horizontal fitting members separated by a gap to facilitate the two fitting members to be elastically pushed in a square hole of a pad hanger extending from a lens rim. Thus, the nose pad is easy and quick to be secured with the pad hanger for use.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
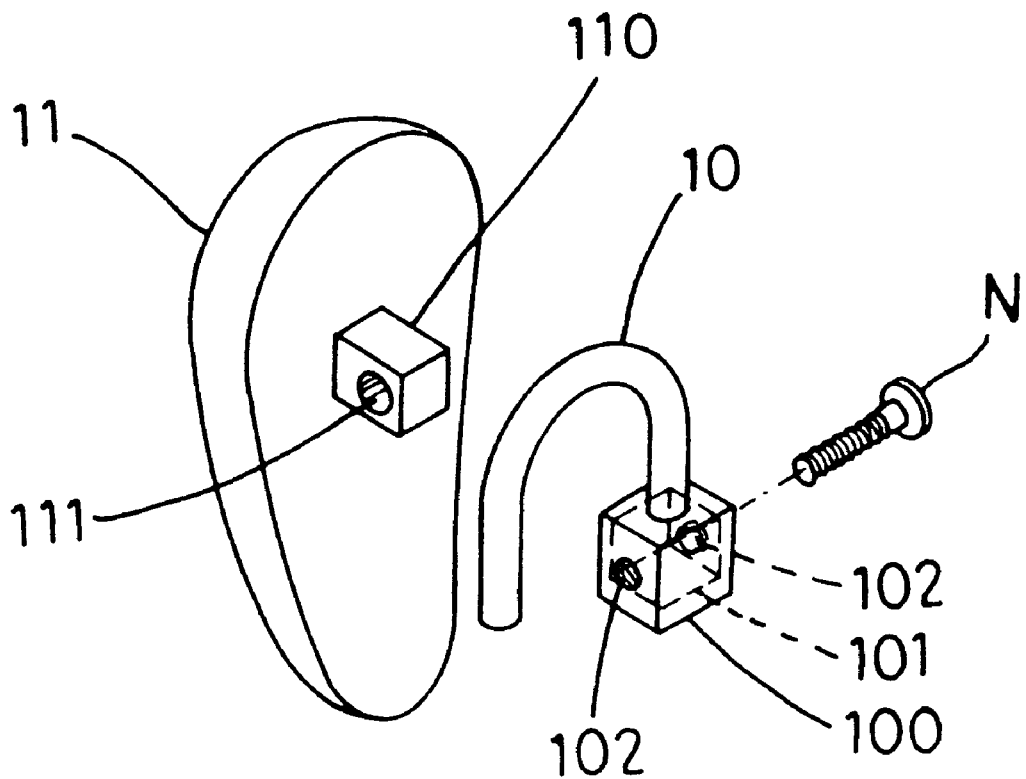
FIG. 1 is an exploded perspective view of a conventional nose pad.
Figure 2:
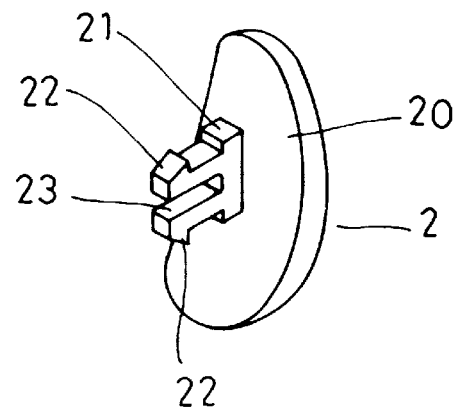
FIG. 2 is a perspective view of a nose pad in the present invention.

A preferred embodiment of a nose pad in the present invention, as shown in FIG. 2, includes a nose pad 2 made of plastic and having a nose pad body 20, and a pad hanger 30 combined together.

The nose pad body 20 has an insert member 21 formed to extend sideways and outwardly therefrom, and the insert member 21 has two parallel horizontal fitting members 22 extending horizontally and separated with a gap 23 to permit the two fitting members to be compressed inward inwardly. The two fitting members each have a front sloped section on an outer surface and a vertical face behind the front sloped section.

The pad hanger 30 is made integral with a lens rim, extending from the lens rim 3, and having a square hole 31 for the two fitting members 22 to elastically engage therein to securely attach the nose pad in place.

Figure 3:
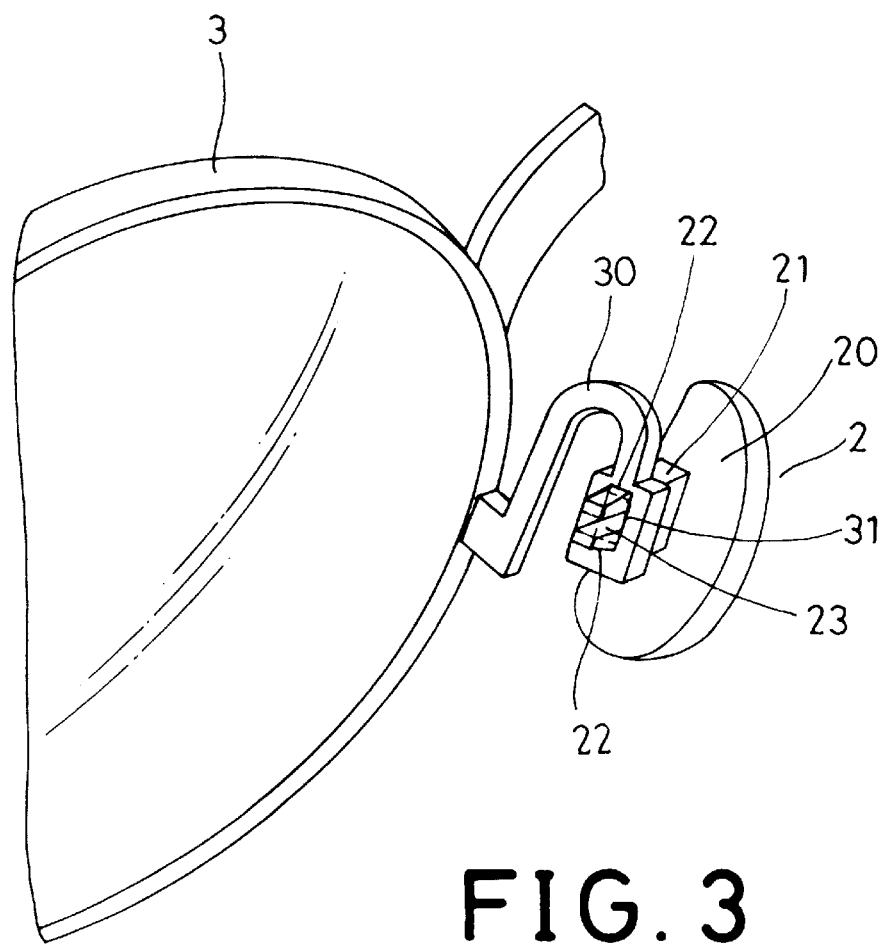
FIG. 3 is a perspective view of the nose pad partially combined with a pad hanger in the present invention.
Figure 4:
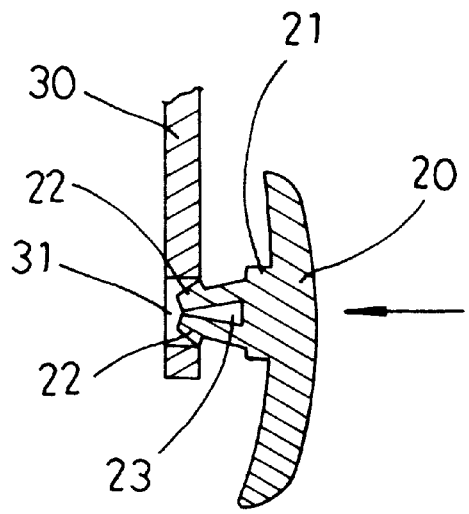
FIG. 4 is a cross-sectional view of the nose pad partially combined with the pad hanger in the present invention; and, FIG. 5 is a cross-sectional view of the nose pad completely combined with the pad hanger in the present invention.
Figure 5:
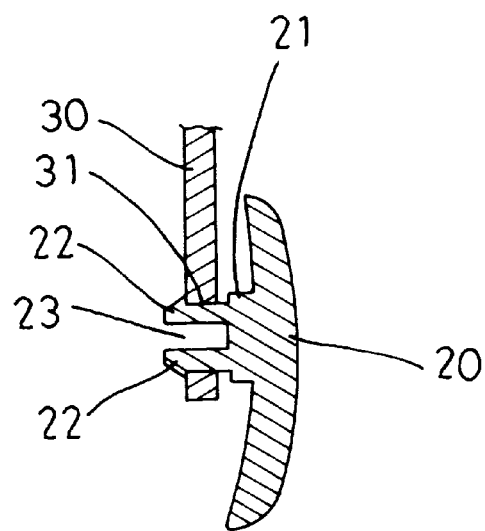

In using, as shown in FIGS. 2 and 3, the nose pad 2 has the fitting members 22 of the insert member 21 forcibly compressed toward the gap 23 and pushed in the square hole 31 of the pad hanger 30 as shown in FIG. 4, letting the front sloped section of each fitting member 22 contacting an inner surface of the square hole 31 and then the fitting members 22 are pushed to move through the square hole 31 so that their front ends protrude out of the hole 31, with the vertical face of each fitting member 22 being stopped by the front end of the hole 31 and the two fitting members 22 recovering the is original shape as shown in FIG. 5. Then the nose pad 2 is immovably secured with the pad hanger 30. Thus, the nose pad 2 is easily and quickly combined with the pad hanger 30, without using any screws or any tools, in a very convenient manner. In addition, only one mold is necessary for forming the nose pad, thus lowering the cost, and its material is plastic for, reducing the weight of the nose pad for comfortable wearing.

The nose pad in the invention has the following advantages.

1. It is made integral, and its fitting members can be pushed in the hole of the pad hanger to secure it with the pad hanger, not needing any tool, and is very convenient.

2. It needs only one mold for forming, quick to manufacture at lower cost.

3. It is made of plastic, very light in weight, permitting comfortable use.

While the preferred embodiment of the invention has been described above, it will be recognized and understood that various modifications may be made thereto and the appended claims are intended to cover all such modifications which may fall within the spirit and scope of the invention.

What is claimed is:

1. A nose pad and hanger assembly for eyeglasses comprising a nose pad made of plastic, said nose pad having a nose pad body and an insert member formed to extend sideways from said nose pad body, said insert member having two parallel horizontal fitting members separated with a gap between them, said two parallel fitting members each respectively having a front sloped-down section on an outer side and a vertical face behind the front sloped-down section, and a pad hanger extending from a lens rim, said two fitting members being forcibly compressible and pushable through a square hole of the pad hanger to permit the front sloped sections to protrude out of said square hole of said pad hanger for immovably securing said nose pad to said pad hanger.

* * * * *